United States Patent
Hsieh et al.

(10) Patent No.: US 9,503,724 B2
(45) Date of Patent: Nov. 22, 2016

(54) INTERLEAVE BLOCK PROCESSING ORDERING FOR VIDEO DATA CODING

(71) Applicant: QUALCOMM Incorporated, San Diego, CA (US)

(72) Inventors: Cheng-Teh Hsieh, San Diego, CA (US); Sumit Mohan, San Diego, CA (US); Ling Feng Huang, San Diego, CA (US); Feng Ge, San Diego, CA (US); Stephen Cheung, Richmond Hill (CA)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 13/856,285

(22) Filed: Apr. 3, 2013

(65) Prior Publication Data

US 2013/0301712 A1    Nov. 14, 2013

Related U.S. Application Data

(60) Provisional application No. 61/646,787, filed on May 14, 2012, provisional application No. 61/737,510, filed on Dec. 14, 2012.

(51) Int. Cl.
*H04N 7/18* (2006.01)
*H04N 11/02* (2006.01)
(Continued)

(52) U.S. Cl.
CPC ...... *H04N 19/00775* (2013.01); *H04N 19/129* (2014.11); *H04N 19/156* (2014.11); *H04N 19/186* (2014.11); *H04N 19/436* (2014.11); *H04N 19/176* (2014.11)

(58) Field of Classification Search
CPC ............ H04N 7/12–7/18; H04N 11/02–11/04
See application file for complete search history.

(56) References Cited

U.S. PATENT DOCUMENTS 5,047,865 A    9/1991  Inoue
5,343,243 A    8/1994  Maeda
(Continued)

FOREIGN PATENT DOCUMENTS

JP    2008182527     *  8/2008  ............... H04N 7/32
JP    2008182527 A     8/2008
(Continued)

OTHER PUBLICATIONS

Chen, To-Wei et al., "Architecture Design of H.264/AVC Decoder with Hybrid Task Pipelining for High Definition Videos", Conference Proceedings / IEEE International Symposium on Circuits and Systems (ISCAS) May 23-26, 2005, International Conference Center, Kobe, Japan, IEEE Service Center, Piscataway, NJ, May 23, 2005, pp. 2931-2934, XP010816206, DOI: 10.1109/ISCAS.2005.1465241, ISBN: 978-0-7803-8834-5.
(Continued)

*Primary Examiner* — Behrooz Senfi
*Assistant Examiner* — Maryam Nasri
(74) *Attorney, Agent, or Firm* — Knobbe Martens Olson & Bear LLP

(57) ABSTRACT

Systems and methods for interleaving video sub-blocks in video coding are described herein. In one aspect, an apparatus includes a memory and a video coder. The memory stores a first video block and a second video block. The first video block and the second video block include sub-blocks. The video coder processes a first sub-block of the first video block according to a first process and a second process, and processes a second sub-block of the first video block according to the first process and the second process after processing the first sub-block of the first video block according to the first process and the second process. Further, the video coder processes a first sub-block of the second video block according to the first process before processing the second sub-block of the first video block according to the first process.

16 Claims, 5 Drawing Sheets

(51) Int. Cl.
*H04N 19/60* (2014.01)
*H04N 19/129* (2014.01)
*H04N 19/186* (2014.01)
*H04N 19/156* (2014.01)
*H04N 19/436* (2014.01)
*H04N 19/176* (2014.01)

(56) References Cited

U.S. PATENT DOCUMENTS 5,845,041 A 12/1998 Ohkuma et al.
6,021,249 A 2/2000 Kitamura
2007/0025626 A1 2/2007 Birinov et al.
2008/0123750 A1* 5/2008 Bronstein ............ H04N 19/17
　　　　　　　　　　　　　　　　　　　　375/240.24
2009/0304073 A1 12/2009 Usman et al.
2012/0128069 A1 5/2012 Sato

FOREIGN PATENT DOCUMENTS

WO 9827741 A1 6/1998
WO 2011018965 A1 2/2011

OTHER PUBLICATIONS

International Search Report and Written Opinion—PCT/US2013/035226—ISA/EPO—Jul. 25, 2013.

* cited by examiner

| y0  | y1  | y2  | y3  |
|-----|-----|-----|-----|
| y4  | y5  | y6  | y7  |
| y8  | y9  | y10 | y11 |
| y12 | y13 | y14 | y15 |

Cr:

| cr0 | cr1 |
|-----|-----|
| cr2 | cr3 |

Cb:

| cb0 | cb1 |
|-----|-----|
| cb2 | cb3 |

FIG. 4B

| | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 | t24 | t25 | t26 | t27 |
|---|---|---|---|---|---|---|---|---|---|---|---|---|---|---|---|---|---|---|---|---|---|---|---|---|---|---|---|---|
| T and Q: | y0 | cr0 | y1 | cr1 | y2 | y4 | y3 | y5 | cr2 | y6 | y8 | y7 | y9 | cr3 | y10 | y12 | y11 | cb0 | y13 | y14 | cb1 | y15 | cb2 | cb3 | | | | |
| IQ and IT: | y0 | | y1 | | y2 | y4 | y3 | y5 | | y6 | y8 | y7 | y9 | | y10 | y12 | y11 | y13 | cr0 | y14 | cr1 | y15 | cr2 | cr3 | cb0 | cb1 | cb2 | cb3 |

FIG. 4C

| | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 | t24 | t25 | t26 | t27 |
|---|---|---|---|---|---|---|---|---|---|---|---|---|---|---|---|---|---|---|---|---|---|---|---|---|---|---|---|---|
| T and Q: | y0 | cr0 | y1 | cr1 | y2 | y4 | y3 | y5 | cr2 | y6 | y8 | y7 | y9 | cr3 | y12 | y10 | y13 | y11 | cb0 | y14 | cb1 | y15 | cb2 | cb3 | | | | |
| IQ and IT: | y0 | | y1 | | y2 | y4 | y3 | y5 | | y6 | y8 | y7 | y9 | | y12 | y10 | y11 | y13 | cr0 | y14 | cr2 | y15 | cr3 | | cb0 | cb1 | cb2 | cb3 |

INTERLEAVE BLOCK PROCESSING ORDERING FOR VIDEO DATA CODING

CROSS REFERENCE TO RELATED APPLICATIONS

This application claims benefit under 35 U.S.C. §119(e) to U.S. Provisional Patent Application No. 61/646,787 entitled "INTERLEAVE BLOCK PROCESSING ORDER FOR INTRA PREDICTION CODING" filed on May 14, 2012, and to U.S. Provisional Patent Application No. 61/737,510 entitled "INTERLEAVE BLOCK PROCESSING ORDERING FOR VIDEO DATA CODING" filed on Dec. 14, 2012; the disclosures of these applications are hereby incorporated by reference in their entirety.

FIELD

This disclosure relates to video data coding, and in particular to interleaving sub-blocks of luminance and color difference blocks in video data coding.

BACKGROUND

Digital video coding is used in wide range of devices, including digital televisions, digital direct broadcast systems, wireless communication devices, personal digital assistants (PDAs), laptop or desktop computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently.

Video compression techniques generally perform spatial prediction, motion estimation, and motion compensation to reduce or remove redundancy inherent in video data. In particular, intra coding relies on spatial prediction to reduce or remove spatial redundancy in video within a given video frame.

SUMMARY

The systems, methods and devices of this disclosure each have several innovative aspects, no single one of which is solely responsible for the desirable attributes disclosed herein.

One aspect of this disclosure provides an apparatus for coding video data including video blocks. The apparatus includes a memory and a video coder. The memory is configured to store a first video block and a second video block. The first video block and the second video block include sub-blocks. The video coder is configured to process a first sub-block of the first video block according to a first process and a second process, and process a second sub-block of the first video block according to the first process and the second process after processing the first sub-block of the first video block according to the first process and the second process. Further, the video coder is configured to process a first sub-block of the second video block according to the first process before processing the second sub-block of the first video block according to the first process.

Another aspect of this disclosure provides a method for coding video blocks including sub-blocks. The method includes processing a first sub-block of a first video block according to a first process and a second process; processing a first sub-block of a second video block according to the first process before processing a second sub-block of the first video block according to the first process; and processing the second sub-block of the first video block according to the first process and the second process after processing the first sub-block of the first video block according to the first process and the second process.

One aspect of this disclosure provides an apparatus for coding video data including video blocks. The apparatus include means for storing a first video block and a second video block. The first video block and the second video block include sub-blocks. Further, the apparatus includes means for processing a first sub-block of the first video block according to a first process and a second process, a first sub-block of the second video block according to the first process before processing a second sub-block of the first video block according to the first process, and the second sub-block of the first video block according to the first process and the second process after processing the first sub-block of the first video block according to the first process and the second process.

Another aspect of this disclosure provides a non-transitory, computer-readable medium comprising instructions that when executed cause an apparatus for coding video blocks including sub-blocks to: process a first sub-block of a first video block according to a first process and a second process; process a first sub-block of a second video block according to the first process before processing a second sub-block of the first video block according to the first process; and process the second sub-block of the first video block according to the first process and the second process after processing the first sub-block of the first video block according to the first process and the second process.

BRIEF DESCRIPTION OF DRAWINGS

FIG. 4A illustrates an example luminance block, red color difference block, and blue color difference block.

FIG. 4B illustrates an example interleave block processing order.

FIG. 4C illustrates another example interleave block processing order.

DETAILED DESCRIPTION

In general, this disclosure is directed to techniques for interleaving sub-blocks of luminance and color difference blocks in video coding. The term "coding," as used herein, may refer to encoding, decoding or both. Although the techniques described in this disclosure may be applicable to a wide variety of practical applications, the disclosure will refer to digital video encoding and decoding for purposes of example and illustration.

During coding of video data, processing of some video data may depend on the results of processing other video data. For example, intra coding of video data creates data dependency between pixels of a video block and neighboring pixels to the video block. The neighboring pixels to the video block may need to be processed before processing may begin on the video block. This dependency may result in components of a system remaining idle and awaiting completion of processing by other components. Such idle time can increase coding latency delay, decrease coding throughput, and necessitate greater chip area for hardware to intra code video data.

Advantageously, in some aspects, the methods and devices disclosed herein may include interleaving a processing order of sub-blocks of video blocks to enable more efficient utilization of components during video coding. For instance, the processing order for sub-blocks of luminance and color difference blocks may interleaved so that component idle time due to dependencies between luminance sub-blocks is reduced and a more pipeline-like processing of data is performed.

Figure 1:
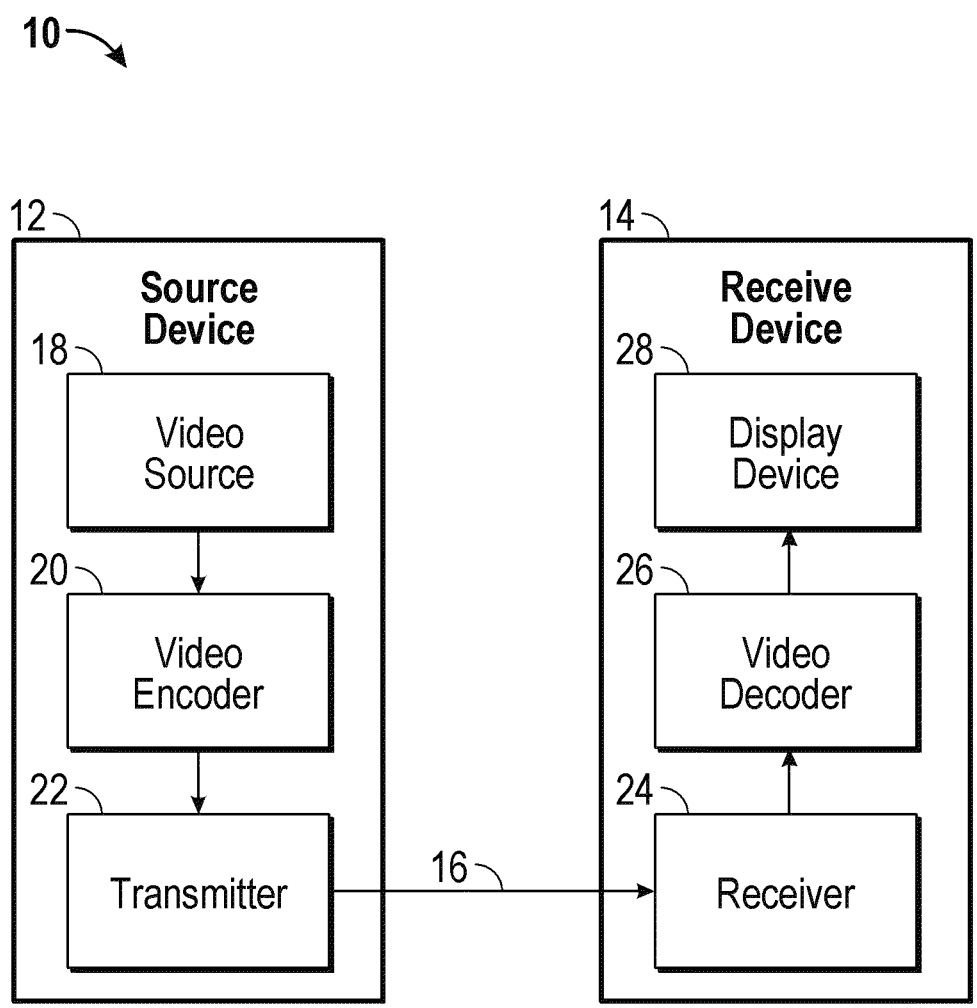
FIG. 1 is a block diagram illustrating an example video encoding and decoding system.

FIG. 1 is a block diagram illustrating an example video encoding and decoding system 10. As shown in FIG. 1, system 10 includes a source device 12 that transmits encoded video to a receive device 14 via a communication channel 16. Source device 12 may include a video source 18, video encoder 20, and a transmitter 22. Receive device 14 may include a receiver 24, video decoder 26, and video display device 28. System 10 may be configured to apply techniques for interleaving and processing interleaved sub-blocks in accordance with this disclosure.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. For other data compression and coding applications, devices 12, 14 could be configured to send and receive, or exchange, other types of data, such as image, speech or audio data, or combinations of two or more of video, image, speech, and audio data. Accordingly, discussion of video encoding and decoding applications is provided for purposes of illustration and should not be considered limiting of the various aspects of the disclosure as broadly described herein.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. Hence, in some aspects, source device 12, receive device 14 or both may form a wireless communication device handset, such as a mobile telephone handset. In each case, the captured, pre-captured, or computer-generated video may be encoded by video encoder 20 for transmission from video source device 12 to video decoder 26 of video receive device 14 via transmitter 22, channel 16, and receiver 24. Display device 28 may include any of a variety of display devices, such as a liquid crystal display (LCD), plasma display, or organic light emitting diode (OLED) display.

Video encoder 20 and video decoder 26 may be configured to support scalable video coding (SVC) for spatial, temporal, and/or signal-to-noise ratio (SNR) scalability. In some aspects, video encoder 20 and video decoder 26 may be configured to support fine granularity SNR scalability (FGS) coding for SVC. Encoder 20 and decoder 26 may support various degrees of scalability by supporting encoding, transmitting, and decoding of a base layer and one or more scalable enhancement layers. For scalable video coding, a base layer carries video data with a minimum level of quality. One or more enhancement layers carry additional bitstream to support higher spatial, temporal and/or SNR levels.

Video encoder 20 and video decoder 26 may operate in part according to techniques described herein and in part according to a video compression standard, such as HEVC, MPEG-2, MPEG-4, ITU-T H.263, or ITU-T H.264/MPEG-4 Advanced Video Coding (AVC). For example, the techniques used herein may be used to augment or replace the respective techniques used in a video compressions standard. Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced video coding for generic audiovisual services, by the ITU-T Study Group, and dated March 2005, which may be referred to herein as the H.264 standard or H.264 specification, or the H.264/AVC standard or specification.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"), e.g., via a wireless video broadcast server or wireless communication device handset. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 14 of FIG. 1.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video encoder 20 and video decoder 26 may be implemented at least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks composed of video units, such as pixels, within individual video frames in order to encode the video data. The video blocks may have fixed or varying sizes, and may differ in size according to a specified coding standard. Each video frame includes a series of slices. Each slice may include a series of macroblocks (MBs), which may be arranged into blocks or sub-blocks. As an example, the ITU-T H.264 standard supports intra prediction in various block sizes, such as 16×16, 8×8, 4×4 for luma or luminance components, and 8×8 for chroma or color difference components, as well as inter prediction in various block sizes, such as 16×16, 16×8, 8×16, 8×8, 8×4, 4×8 and 4×4 for luma components and corresponding scaled sizes for chroma components.

Smaller video blocks can provide better resolution, and may be used for locations of a video frame that include higher levels of detail. In general, MBs and the various sub-blocks may be considered to be video blocks. In addition, a slice may be considered to be a series of video blocks, such as MBs and/or sub-blocks. Each slice may be an independently decodable unit. After prediction, a transform may be performed on the 8×8 residual block or 4×4 residual block, and an additional transform may be applied to the DC coefficients of the 4×4 blocks for chroma components or luma component if the intra_16×16 prediction mode is used.

Video encoder 20 and/or video decoder 26 of system 10 of FIG. 1 may be further configured to employ techniques for interleaving or processing interleaved luminance and color difference sub-blocks as described in this disclosure. In particular, video encoder 20 and/or video decoder 26 may include one or more interleavers that apply at least some of the described techniques to decrease latency, increase throughput, and/or reduce chip area requirements for video coding.

Figure 2:
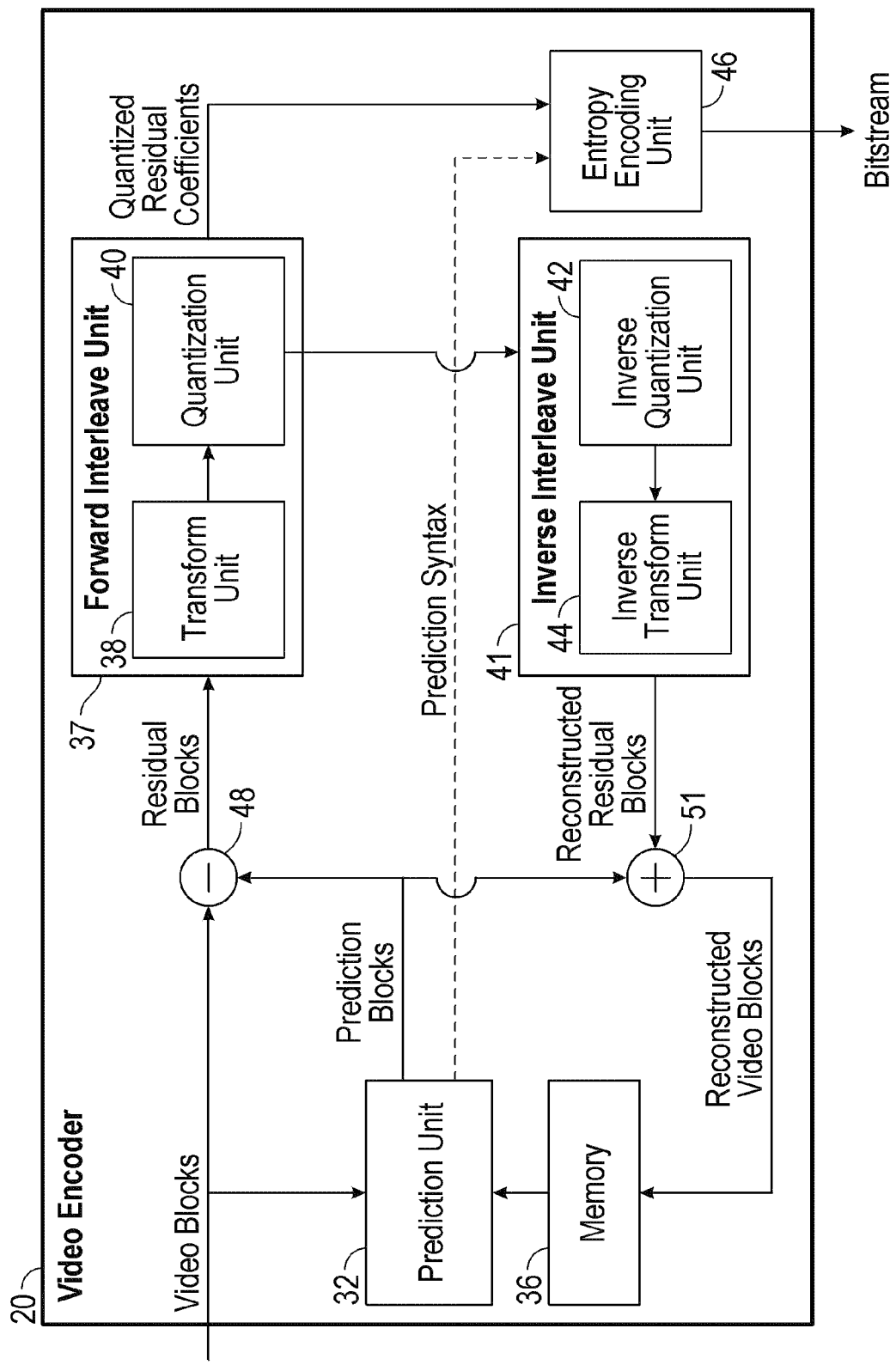
FIG. 2 is a block diagram illustrating an example video encoder.

FIG. 2 is a block diagram illustrating an example video encoder 20 as shown in FIG. 1. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra and inter coding of blocks within video frames.

As shown in FIG. 2, video encoder 20 may include prediction unit 32, adders 48 and 51, and memory 36. Video encoder 20 may also include forward interleave unit 37 including transform unit 38 and quantization unit 40, as well as inverse interleave unit 41 including inverse quantization unit 42 and inverse transform unit 44. Video encoder 20 may also include entropy coding unit 46. One or more filters (not shown) may additionally be implemented in the encoding process. In some aspects, forward interleave unit 37 may be a separate unit from transform unit 38 or quantization unit 40, and inverse interleave unit 41 may be a separate unit from inverse quantization unit 42 or inverse transform unit 44.

During the encoding process, video encoder 20 receives a video block to be coded, and prediction unit 32 performs predictive coding techniques. For inter coding, prediction unit 32 may compare the video block to be encoded to various blocks in one or more video reference frames or slices in order to define a predictive block. For intra coding, prediction unit 32 generates a predictive block based on neighboring data within the same coded unit. One or more intra prediction modes (e.g., directional mode, mean mode, or planar mode) may define how an intra prediction block may be defined. Prediction unit 32 outputs the prediction block and adder 48 subtracts the prediction block from the video block being coded in order to generate a residual block.

After prediction unit 32 outputs the prediction block and adder 48 subtracts the prediction block from the video block being coded in order to generate a residual block, forward interleave unit 37 receives the residual block from adder 48. The received residual block may include a luminance block or a red or blue color difference block, for instance. Forward interleave unit 37 may then interleave and/or arrange sub-blocks of one or more residual blocks for processing by transform unit 38 and quantization unit 40. In some aspects, adder 48 or other components of video encoder 20 may perform the functions performed by the forward interleave unit 37.

Forward interleave unit 37 may transmit the one or more residual sub-blocks to transform unit 38. Transform unit 38 may apply a transform to the received video units, producing residual transform coefficients. The transform may convert the residual information from a pixel domain to a frequency domain. The transform may comprise a discrete cosine transform (DCT) or a conceptually similar transform, such as that defined by the H.264 standard. Wavelet transforms, integer transforms, sub-band transforms or other types of transforms may be used. Quantization unit 40 may then quantize the residual transform coefficients to further reduce bit rate. Quantization unit 40, for example, may limit the number of bits used to code each of the coefficients. Forward interleave unit 37 may then transmit the quantized residual transform coefficients to entropy encoding unit 46. In some aspects, forward interleave unit 37 may further arrange the quantized residual transform coefficients in a different order or block organization before transmitting the quantized residual transform coefficients to entropy encoding unit 46 or inverse interleave unit 41.

Entropy encoding unit 46 may encode the quantized residual transform coefficients (along with any syntax elements) according to an entropy coding methodology, such as CAVLC or CABAC, to further compress the data. Syntax elements included in the entropy coded bitstream may include prediction syntax from prediction unit 32, such as motion vectors for inter coding or prediction modes for intra coding. Syntax elements included in the entropy coded bitstream may also include filter information or other data that may be used in the decoding process. Following the entropy coding by entropy encoding unit 46, the encoded video may be transmitted to another device or archived for later transmission or retrieval.

Inverse interleave unit 41 may receive the quantized residual transform coefficients and interleave and/or arrange one or more of the coefficients for processing by inverse quantization unit 42 and inverse transform unit 44. Inverse interleave unit 41 may transmit the quantized residual transform coefficients to inverse quantization unit 42 and inverse transform unit 44. Inverse quantization unit 42 and inverse transform unit 44 may apply inverse quantization and inverse transform, respectively, to reconstruct the residual video units in the pixel domain. Inverse interleave unit 41 may then reconstruct residual blocks before transmitting the video units to adder 51.

Adder 51 may add the reconstructed residual block to the prediction block produced by prediction unit 32 to produce a reconstructed video block for storage in memory 36. Prior to storage, filtering may also be applied on the video block to improve video quality. Such filtering may reduce blockiness or other artifacts, and may be performed in loop (in which case the data used for prediction may be filtered data) or post loop (in which case the data used for prediction may be unfiltered data).

Although the example described with respect to FIG. 2 illustrates the transmission path of video blocks through video encoder 20, components of video encoder 20 may additionally or alternatively receive and/or output sub-blocks of video blocks. For example, prediction unit 32 of video encoder 20 may receive one or more blocks as inputs and output sub-blocks of the blocks, and adder 48 of video encoder 20 may receive one or more sub-blocks or blocks as inputs and output sub-blocks. Further, prediction unit 32 and adder 48 may, in some implementations, output the sub-blocks of the blocks according to an order where the sub-blocks of one or more blocks are interleaved. In some aspects, prediction unit 32 may generate and output predictive sub-blocks for luminance and color difference blocks in an order where luminance and color difference sub-blocks are interleaved, and adder 48 may in turn output residual sub-blocks in a corresponding order.

Figure 3:
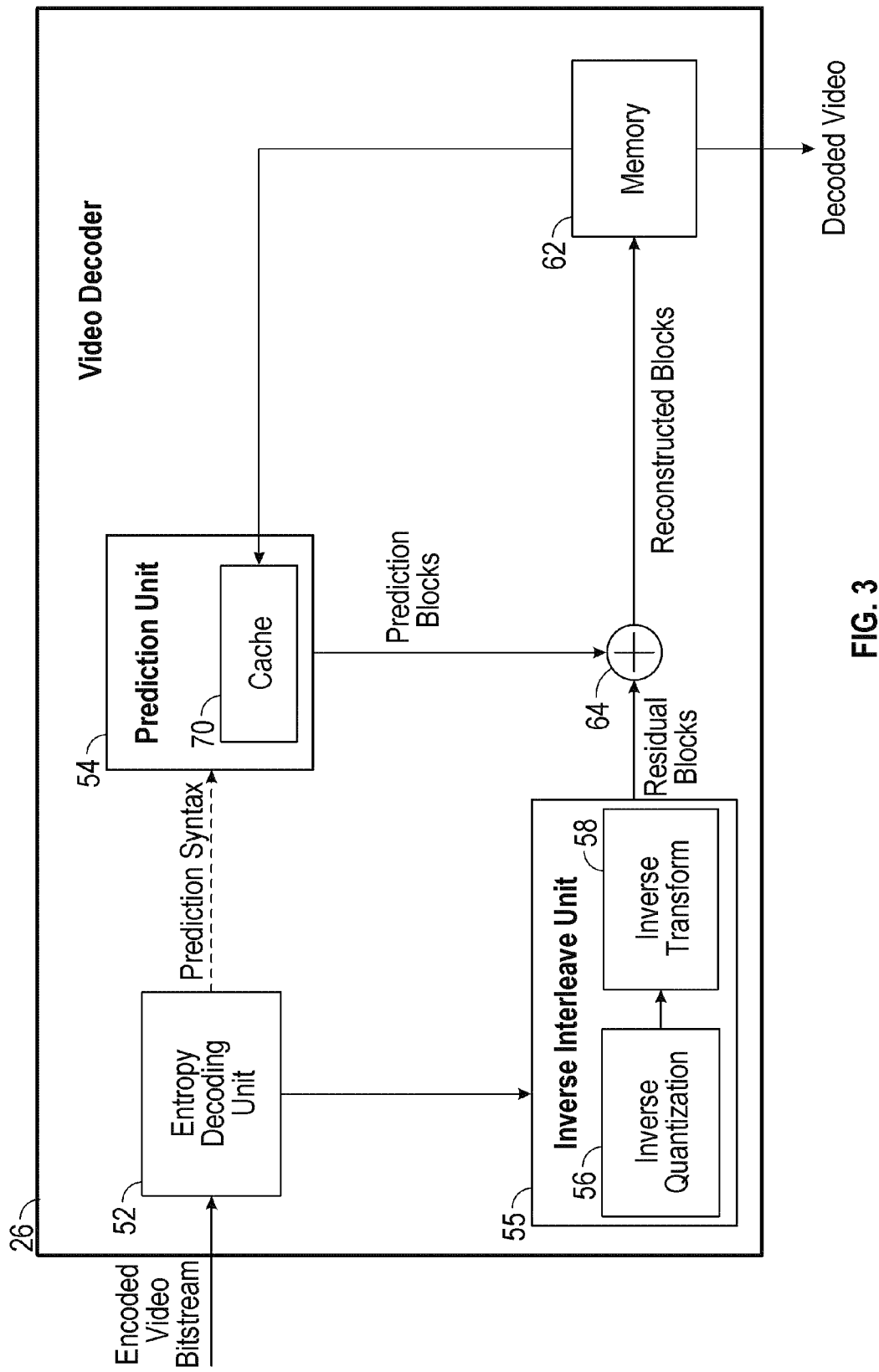
FIG. 3 is a block diagram illustrating an example video decoder.

FIG. 3 is a block diagram illustrating an example video decoder 26 as shown in FIG. 1. Video decoder 26 may be formed at least in part as one or more integrated circuit devices, which may be referred to collectively as an integrated circuit device. In some aspects, video decoder 26 may form part of a wireless communication device handset. Video decoder 26 may perform intra and inter decoding of blocks within video frames. In general, video decoder 26 may perform inverse operations to video encoder 20, including decoding and parsing to decode and reconstruct the encoded video.

Video decoder 26 may include entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoded video blocks in a one-dimensional serialized format may be inverse scanned to convert one or more one-dimensional vectors of coefficients back into a two-dimensional block format. The number and size of the vectors, as well as the scan order defined for the video blocks may define how the two-dimensional block is reconstructed. Entropy decoded prediction syntax elements such as motion vectors or other decoded syntax elements may be sent from entropy decoding unit 52 to prediction unit 54.

Video decoder 26 may also include prediction unit 54, inverse interleave unit 55, memory 62, and adder 64. Inverse interleave unit 55 may include inverse quantization unit 56 and inverse transform unit 58. In some aspects, inverse interleave unit 55 may be a separate unit from inverse quantization unit 56 or inverse transform unit 58. In addition, video decoder 26 may also include a filter unit (not shown) that filters the output of adder 64. Prediction unit 54 may include associated cache 70, which may comprise a relatively fast internal memory circuit, e.g., that is faster and smaller than memory 62. Predictive data may be loaded from memory 62 to cache 70 based on statistics of one or more video units so as to promote data in cache 70 that will be needed for the decoding process.

Prediction unit 54 may receive prediction syntax (such as motion vectors) from entropy decoding unit 52. Using the prediction syntax, prediction unit 54 generates the prediction blocks from cache 70, which may be combined with residual blocks via adder 64. Inverse interleave unit 55 may receive quantized residual transform coefficients from entropy decoding unit 52 and interleave and/or arrange one or more of the coefficients for processing by inverse quantization unit 56 and inverse transform unit 58. Inverse interleave unit 55 may transmit the quantized residual transform coefficients to inverse quantization unit 56 and inverse transform unit 58. Inverse quantization unit 56 may perform inverse quantization, and inverse transform unit 58 may perform inverse transforms to change the coefficients of the residual video blocks back to the pixel domain. Adder 64 combines each prediction block with the corresponding residual block output by inverse interleave unit 55 in order to reconstruct a given video block.

Video decoder 26 may receive a sequence of video units, and the sequence may define a display order of the video units. Prediction unit 54 may identify a subset of the video units that may not be interdependent, and may load predictive data from memory 62 to cache 70, where cache 70 is associated with the prediction unit 54 of video decoder 26. Memory 62 may also be associated with video decoder 26, or may be an external memory that is shared with other processors or units.

Although the example described with respect to FIG. 3 illustrates the transmission path of video blocks through video decoder 26, components of video decoder 26 may additionally or alternatively receive and/or output sub-blocks of video blocks. For example, prediction unit 54 and inverse interleave unit 55 of video decoder 26 may output sub-blocks of blocks, and adder 64 may receive the sub-blocks. Further, prediction unit 54 and adder 64 may, in some implementations, output the sub-blocks of the blocks according to an order where the sub-blocks of one or more blocks are interleaved. In some aspects, prediction unit 54 may generate and output predictive sub-blocks for luminance and color difference blocks in an order where luminance and color difference sub-blocks are interleaved, and inverse interleave unit 55 may output residual sub-blocks in a corresponding order. Adder 64 may receive the sub-blocks from prediction unit 54 and inverse interleave unit 55 and reconstruct luminance and color difference blocks.

FIG. 4A illustrates an example luminance block Y, red color difference block Cr, and blue color difference block Cb. Luminance block Y includes 16 sub-blocks y0, y1, . . . , y15. Red color difference block Cr includes 4 sub-blocks cr0, cr1, cr2, cr3. Blue color difference block Cb includes 4 sub-blocks cb0, cb1, cb2, cb3. Luminance block Y, red color difference block Cr, and blue color difference block Cb may be or correspond to blocks that are output from an adder such as adder 48 of FIG. 2 or entropy decoding unit 52 of FIG. 3.

FIG. 4B illustrates an example interleave block processing order for the sub-blocks of FIG. 4A. The interleave block processing order may correspond to the order in which components of video encoder 20 and video decoder 26 sequence and/or process video units, for example, such as the order that forward interleave unit 37 of FIG. 2, inverse interleave unit 41 of FIG. 2, or inverse interleave unit 55 of FIG. 3 sequence and/or process video units. In contrast to processing all sub-blocks of one block before processing sub-blocks of other blocks, the sub-blocks of multiple blocks are interleaved so that the sub-blocks of the multiple blocks may processed before completing the processing of each block. This interleave block processing order may advantageously manage data dependency between sub-blocks of one block and enable a more pipeline-like processing of blocks in H.264 and VP 8 intra coding. Moreover, as a result, some components of video encoder 20 and video decoder 26 may not remain idle and wait for results of processing a first sub-block before processing another sub-block of the same block. Instead, some components may process one or more sub-blocks of one or more other blocks that can be processed without having the results of processing the first sub-block.

For example, inverse quantization unit 42 and inverse transform unit 44 may begin processing one sub-block of a luminance block. The results of processing the one sub-block may be needed by transform unit 38 and quantization unit 40 to begin processing other sub-blocks of the luminance block. Rather than transform unit 38 and quantization unit 40 remaining idle and waiting for results of processing the one sub-block before processing another sub-block of the luminance block, transform unit 38 and quantization unit 40 may process a sub-block of a color difference block substantially in parallel with inverse quantization unit 42 and inverse transform unit 44 processing the one sub-block of the luminance block. Thereby, video encoder 20 and video decoder 26 may process the luminance block and the color difference block more quickly than if all sub-blocks of the luminance block were processed before processing sub-blocks of the color difference block.

The transform and quantize (T and Q) row and inverse quantize and inverse transform (IQ and IT) row of FIG. 4B may correspond to first and second processing steps, respectively, that are performed beginning at times $t_0, t_1, \ldots, t_{27}$, where greater t index values correspond to events occurring later in time. The transform, quantize, inverse quantize, and inverse transform are processing steps discussed in more detail with respect to FIGS. 2 and 3.

Processing steps performed at a common time, such as $t_1$, may be performed substantially in parallel. For instance, at time $t_1$, sub-block cr0 of red color difference block Cr may be transformed and quantized in parallel with inversely quantizing and inversely transforming sub-block y0 of luminance block Y. Empty cells, such as inverse quantize and inverse transform row at time $t_0$ and quantize and transform row at time $t_{24}$, may correspond to times where no processing steps may be performed.

To discuss some aspects of the illustrated interleave processing order of FIG. 4B, particular relationships between sub-blocks may be highlighted. A first sub-block cr0 of red color difference block Cr may be transformed and quantized before a last sub-block y15 of luminance block Y. The first sub-block cr0 of red color difference block Cr may be transformed and quantized after a first sub-block y0 of luminance block Y. The four Cr sub-blocks cr0, cr1, cr2, cr3 may be transformed and quantized before the last sub-block y15 of luminance block Y. A first sub-block cb0 of blue color difference block Cb may be transformed and quantized before the last sub-block y15 of luminance block Y. The first three sub-blocks cr0, cr1, cr2 of red color difference block Cr, but not the last sub-block cr3, may be inversely quantized and inversely transformed before the last sub-block y15 of luminance block Y.

Although the example interleave block processing order of FIG. 4B shows Cr sub-blocks as processed first, Cr and Cb may be interchangeable as a set. In some aspects, corresponding numbered Cb sub-blocks may be processed in place of corresponding numbered Cr sub-blocks. For example, sub-blocks cb0, cb1, cb2, cb3 of blue color difference block Cb may be processed in place of sub-blocks cr0, cr1, cr2, cr3 of red color difference block Cr, respectively. In addition, although empty cells are shown in FIG. 4B at times t2, t4, and t9 corresponding to no inverse quantization and no inverse transform processing beginning at times t2, t4, and t9, in some aspects, one or more of the cells may not be empty. Instead, one or more sub-blocks, such as Cr sub-blocks, may be processed beginning at times t2, t4, or t9. For example, sub-blocks cr0, cr1, cr2 of red color difference block Cr may be processed beginning at times t2, t4, and t9, respectively. As a result, other color difference sub-blocks may be processed earlier, such as beginning at times t14, t19, and t21, when the sub-blocks cr0, cr1, cr2 of red color difference block Cr may have otherwise been processed.

FIG. 4C illustrates another example interleave block processing order for the sub-blocks of FIG. 4A. The interleave block processing order may correspond to the order in which components of video encoder 20 and video decoder 26 sequence and/or process video units, for example, such as the order that forward interleave unit 37 of FIG. 2, inverse interleave unit 41 of FIG. 2, or inverse interleave unit 55 of FIG. 3 sequence and/or process video units. In contrast to processing all sub-blocks of one block before processing sub-blocks of other blocks, the sub-blocks of multiple blocks are interleaved so that the sub-blocks of the multiple blocks may processed before completing the processing of each block. This interleave block processing order may advantageously manage data dependency between sub-blocks of one block and enable a more pipeline-like processing of blocks in H.264 and VP 8 intra coding. Moreover, as a result, some components of video encoder 20 and video decoder 26 may not remain idle and wait for results of processing a first sub-block before processing another sub-block of the same block. Instead, some components may process one or more sub-blocks of one or more other blocks that can be processed without having the results of processing the first sub-block.

For example, inverse quantization unit 42 and inverse transform unit 44 may begin processing one sub-block of a luminance block. The results of processing the one sub-block may be needed by transform unit 38 and quantization unit 40 to begin processing other sub-blocks of the luminance block. Rather than transform unit 38 and quantization unit 40 remaining idle and waiting for results of processing the one sub-block before processing another sub-block of the luminance block, transform unit 38 and quantization unit 40 may process a sub-block of a color difference block substantially in parallel with inverse quantization unit 42 and inverse transform unit 44 processing the one sub-block of the luminance block. Thereby, video encoder 20 and video decoder 26 may process the luminance block and the color difference block more quickly than if all sub-blocks of the luminance block were processed before processing sub-blocks of the color difference block.

The transform and quantize (T and Q) row and inverse quantize and inverse transform (IQ and IT) row of FIG. 4C may correspond to first and second processing steps, respectively, that are performed beginning at times $t_0, t_1, \ldots, t_{27}$, where greater t index values correspond to events occurring later in time. The transform, quantize, inverse quantize, and inverse transform are processing steps discussed in more detail with respect to FIGS. 2 and 3.

Processing steps performed at a common time, such as $t_1$, may be performed substantially in parallel. For instance, at time $t_1$, cr0 sub-block of red color difference block Cr may be transformed and quantized in parallel with inversely quantizing and inversely transforming y0 sub-block of luminance block Y. Empty cells, such as inverse quantize and inverse transform row at time $t_0$ and quantize and transform row at time $t_{24}$, may correspond to times where no processing steps may be performed.

To discuss some aspects of the illustrated interleave processing order of FIG. 4C, particular relationships between sub-blocks may be highlighted. For example, the four sub-blocks cr0, cr1, cr2, cr3 of red color difference block Cr may be inversely quantized and inversely transformed before the last sub-block y15 of luminance block Y.

Although the example interleave block processing order of FIG. 4C shows Cr sub-blocks as processed first, Cr and Cb may be interchangeable as a set. In some aspects, corresponding numbered Cb sub-blocks may be processed in place of corresponding numbered Cr sub-blocks. For example, sub-blocks cb0, cb1, cb2, cb3 of blue color difference block Cb may be processed in place of sub-blocks cr0, cr1, cr2, cr3 of red color difference block Cr, respectively. In addition, although empty cells are shown in FIG. 4C at times t2, t4, and t9 corresponding to no inverse quantization and no inverse transform processing beginning at times t2, t4, and t9, in some aspects, one or more of the cells may not be empty. Instead, one or more sub-blocks, such as Cr sub-blocks, may be processed beginning at times t2, t4, or t9. For example, sub-blocks cr0, cr1, cr2 of red color difference block Cr may be processed beginning at times t2, t4, and t9, respectively. As a result, other color difference sub-blocks may be processed earlier, such as beginning at times t14, t17, and t20, when the sub-blocks cr0, cr1, cr2 of red color difference block Cr may have otherwise been processed.

In addition, although the examples of FIGS. 4A-4C illustrate implementations of this disclosure in H.264 and VP 8 intra coding, video encoder 20 and video decoder 26 may advantageously interleave a processing order of sub-blocks of video blocks when coding other standards or schemes. For example, if video encoder 20 and video decoder 26 perform HEVC coding, components of video encoder 20 and video decoder 26 may interleave a processing order of transform units of one or more coding units. As in the H.264 and VP 8 intra coding examples of FIGS. 4B and 4C, the interleaved order for transform units in HEVC may reduce component idle time by managing dependencies between transform units of one or more coding units and enable a more pipeline-like processing of data.

Figure 5:
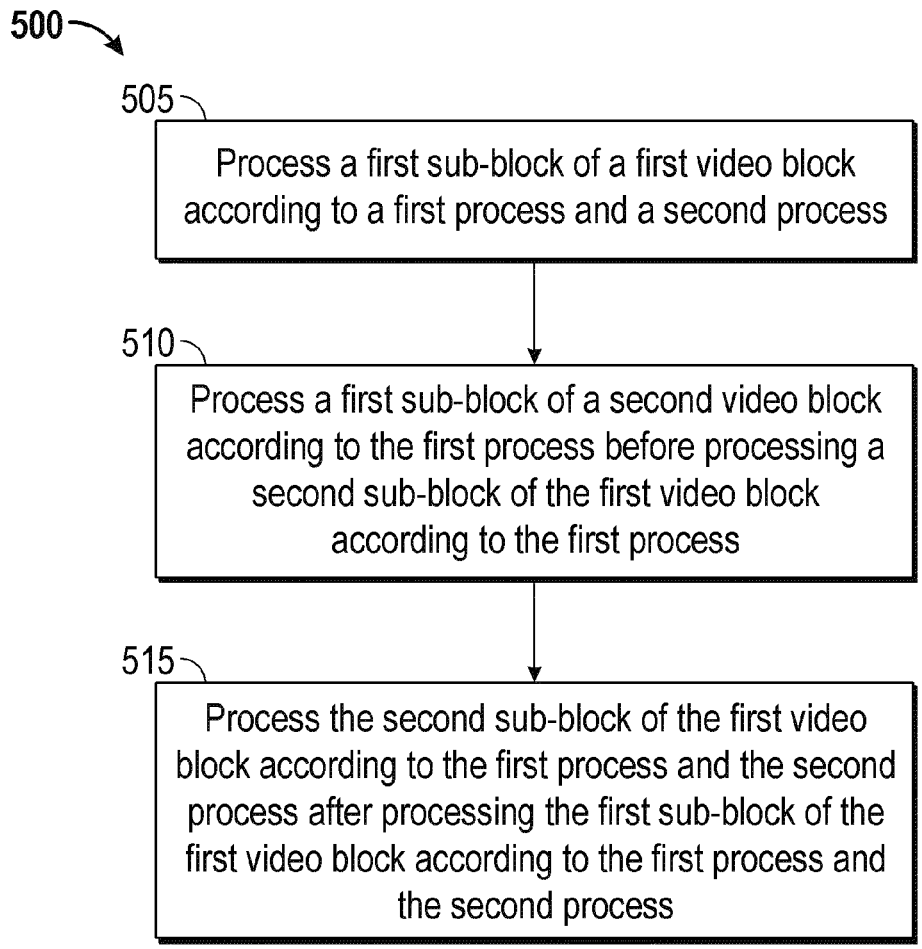
FIG. 5 is a flowchart of an example method for coding video data.

FIG. 5 is a flowchart of an example method 500 of coding video data. The method 500 may be performed using video encoder 20 of FIG. 2, for example. Although method 500 is described below with respect to the elements of video encoder 20 of FIG. 2, other components may be used to implement one or more of the steps. In some aspects, method 500 may be used to decode video with video decoder 26 of FIG. 3.

At node 505, a first sub-block of a first video block is processed according to a first process and a second process. Forward interleave unit 37 and/or inverse interleave unit 41, for example, may process the first sub-block according to a first process including transforming sub-blocks and quantizing the transformed sub-blocks and a second process including inversely quantizing sub-blocks and inversely transforming the inversely quantized sub-blocks. In other aspects, the first process and the second process may include other processing steps in place of or in addition to transforming, quantizing, inversely quantizing, and/or inversely transforming, such as other processes during video coding having inter/intra block or sub-block dependencies causing delay time between parts of the processes.

At node 510, a first sub-block of a second video block is processed according to the first process before processing a second sub-block of the first video block according to the first process. Forward interleave unit 37, for example, may process the first sub-block of the second video block. At node 515, the second sub-block of the first video block is processed according to the first process and the second process after processing the first sub-block of the first video block according to the first process and the second process. Forward interleave unit 37 and/or inverse interleave unit 41, for example, may process the second sub-block of the first video block.

Figure 6:
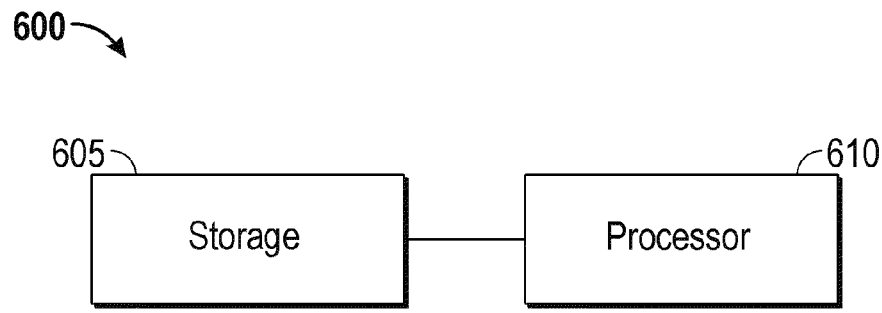
FIG. 6 is a functional block diagram of an example video coder.

FIG. 6 is a functional block diagram of an example video coder 600. Video coder 600 may include storage 605 and processor 610. Storage 605 may be configured to store video blocks and correspond to memory 36 of FIG. 2, for example. Processor 610 may be configured to perform one or more of the functions discussed with respect to nodes 505, 510, 515 of FIG. 5. Processor 610 may correspond to forward interleave unit 37 and/or inverse interleave unit 41 of FIG. 2, for example.

Moreover, in one aspect, means for storing a first video block and a second video block may comprise storage 605. In another aspect, means for processing a first sub-block of the first video block according to a first process and a second process, a second sub-block of the first video block according to the first process and the second process after processing the first sub-block of the first video block according to the first process and the second process, and a first sub-block of the second video block according to the first process before processing the second sub block of the first video block according to the first process may comprise processor 610.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

What is claimed is:

1. An apparatus for coding video data including video blocks, the apparatus comprising:

a memory configured to store a first video block and a second video block, the first video block and the second video block comprising sub-blocks; and
a video coder configured to:
process a first sub-block of the first video block according to a first process and a second process,
process a second sub-block of the first video block according to the first process and the second process, after processing the first sub-block of the first video block according to the first process and the second process,
process a first sub-block of the second video block according to the first process before processing the second sub-block of the first video block according to the first process,
process the first sub-block of the first video block according to the second process substantially in parallel with processing the first sub-block of the second video block according to the first process, and
begin to process a second sub-block of the first video block according to the first process after processing the first sub-block of the first video block according to the second process,
wherein the first video block comprises a luminance block, and the second video block comprises a first color difference block and wherein a first order of sub-blocks of the first and second video blocks processed by the first process is different from a second order of the same sub-blocks of the first and second video blocks processed by the second process and wherein the video coder, when coding the video blocks, reduces idle time caused by dependencies between sub-blocks of the video blocks.

2. The apparatus of claim 1, wherein a macroblock comprises the first video block and the second video block.

3. The apparatus of claim 1, wherein the video coder is further configured to process the second sub-block of the first video block according to the second process after processing the first sub-block of the second video block according to the second process.

4. The apparatus of claim 1, wherein
the memory is further configured to store a third video block, the third video block comprising a second color difference block and having sub-blocks, and
the video coder is further configured to process a first sub-block of the third video block according to the first process before processing the second sub-block of the first video block according to the first process.

5. The apparatus of claim 4, wherein the first process comprises transforming sub-blocks to a frequency domain representation and quantizing the transformed sub-blocks, and the second process comprises inversely quantizing sub-blocks and inversely transforming the inversely quantized sub-blocks.

6. The apparatus of claim 4, wherein the first color difference block comprises a red color difference block, and the second color difference block comprises a blue color difference block.

7. The apparatus of claim 4, wherein the luminance block comprises 16 sub-blocks, the first color difference block comprises 4 sub-blocks, and the second color difference block comprises 4 sub-blocks.

8. A method for coding video data including video sub-blocks, the method comprising:
processing a first sub-block of the first video block according to a first process and a second process, processing a first sub-block of a second video block according to the first process before processing a second sub-block of the first video block according to the first process, processing the second sub-block of the first video block according to the first process and the second process, after processing the first sub-block of the first video block according to the first process and the second process, processing the first sub-block of the first video block according to the second process substantially in parallel with processing the first sub-block of the second video block according to the first process, and beginning processing the second sub-block of the first video block according to the first process after processing the first sub-block of the first video block according to the second process, wherein the first video block comprises a luminance block, and the second video block comprises a first color difference block and wherein a first order of sub-blocks of the first and second video blocks processed by the first process is different from a second order of the same sub-blocks of the first and second video blocks processed by the second process and wherein the video coder, when coding the video blocks, reduces idle time caused by dependencies between sub-blocks of the video blocks.

9. The method of claim 8, wherein a macroblock comprises the first video block and the second video block.

10. The method of claim 8, further comprising processing the second sub-block of the first video block according to the second process after processing the first sub-block of the second video block according to the second process.

11. The method of claim 8, further comprising processing a first sub-block of a third video block according to the first process before processing the second sub-block of the first video block according to the first process, the third video block comprising a second color difference block.

12. The method of claim 11, wherein the first process comprises transforming sub-blocks to a frequency domain representation and quantizing the transformed sub-blocks, and the second process comprises inversely quantizing sub-blocks and inversely transforming the inversely quantized sub-blocks.

13. The method of claim 11, wherein the first color difference block comprises a red color difference block, and the second color difference block comprises a blue color difference block.

14. The method of claim 11, wherein the luminance block comprises 16 sub-blocks, the first color difference block comprises 4 sub-blocks, and the second color difference block comprises 4 sub-blocks.

15. An apparatus for coding video data including video blocks, the apparatus comprising:
means for storing a first video block and a second video block, the first video block and the second video block comprising sub-blocks; and
means for processing
a first sub-block of the first video block according to a first process and a second process,
a first sub-block of the second video block according to the first process before processing the second sub-block of the first video block according to the first process,
the second sub-block of the first video block according to the first process and the second process, after processing the first sub-block of the first video block according to the first process and the second process,
the first sub-block of the first video block according to the second process substantially in parallel with processing the first sub-block of the second video block according to the first process, and
the second sub-block of the first video block according to the first process, beginning after processing the first sub-block of the first video block according to the second process,
wherein the first video block comprises a luminance block, and the second video block comprises a first color difference block and wherein a first order of sub-blocks of the first and second video blocks processed by the first process is different from a second order of the same sub-blocks of the first and second video blocks processed by the second process and wherein the video coder, when coding the video blocks, reduces idle time caused by dependencies between sub-blocks of the video blocks.

16. A non-transitory, computer-readable medium comprising instructions that when executed cause an apparatus for coding video blocks including sub-blocks to:
process a first sub-block of the first video block according to a first process and a second process,
process a first sub-block of a second video block according to the first process before processing a second sub-block of the first video block according to the first process,
process the second sub-block of the first video block according to the first process and the second process, after processing the first sub-block of the first video block according to the first process and the second process,
process the first sub-block of the first video block according to the second process substantially in parallel with processing the first sub-block of the second video block according to the first process, and
begin to process a second sub-block of the first video block according to the first process after processing the first sub-block of the first video block according to the second process,
wherein the first video block comprises a luminance block, and the second video block comprises a first color difference block and wherein a first order of sub-blocks of the first and second video blocks processed by the first process is different from a second order of the same sub-blocks of the first and second video blocks processed by the second process and wherein the video coder, when coding the video blocks, reduces idle time caused by dependencies between sub-blocks of the video blocks.

* * * * *